United States Patent
Ito (10) Patent No.: US 8,441,994 B2
(45) Date of Patent: May 14, 2013

(54) COMMUNICATION METHOD AND, TERMINAL APPARATUS AND COMMUNICATION SYSTEM USING THE METHOD

(75) Inventor: Kiyoshige Ito, Gifu (JP)

(73) Assignee: Hera Wireless S.A., Luxembourg (LU)

( * ) Notice: Subject to any disclaimer, the term of this patent is extended or adjusted under 35 U.S.C. 154(b) by 394 days.

(21) Appl. No.: 12/596,354

(22) PCT Filed: Apr. 9, 2008

(86) PCT No.: PCT/JP2008/000929
§ 371 (c)(1),
(2), (4) Date: Apr. 6, 2010

(87) PCT Pub. No.: WO2008/132790
PCT Pub. Date: Nov. 6, 2008

(65) Prior Publication Data
US 2010/0195533 A1    Aug. 5, 2010

(30) Foreign Application Priority Data
Apr. 16, 2007  (JP) .................. 2007-107230

(51) Int. Cl.
*H04W 4/00* (2009.01)
(52) U.S. Cl.
USPC ........................................ 370/329; 709/227
(58) Field of Classification Search ................. 370/328, 370/329; 709/227
See application file for complete search history.

(56) References Cited

U.S. PATENT DOCUMENTS 6,026,303 A * 2/2000 Minamisawa ............... 455/446

2008/0069105 A1 * 3/2008 Costa et al. ............. 370/392
2008/0253315 A1 * 10/2008 Bodlaender ............. 370/328
2009/0067366 A1 * 3/2009 Aust et al. ............... 370/328

FOREIGN PATENT DOCUMENTS

| JP | 2001-332987 A | | 11/2001 |
| JP | 2003-069580 A | | 3/2003 |
| JP | 2004-007351 | | 1/2004 |
| JP | 2004-15484 A | | 1/2004 |
| JP | 2004-015655 | | 1/2004 |
| JP | 2005-151008 A | | 6/2005 |
| JP | 2005311527 A | * | 11/2005 |
| JP | 2005-347911 A | | 12/2005 |
| JP | 2006-319755 | | 11/2006 |

OTHER PUBLICATIONS

K. Mase et al., "Ad Hoc Networks," Technical Survey, vol. 84, No. 2. pp. 127-134, 2001; w/ English translation.
International Search Report issued in International Patent Application No. PCT/JP2008/000929 dated Jul. 15, 2008.

(Continued)

*Primary Examiner* — Jung Park
(74) *Attorney, Agent, or Firm* — DC Patent Lawyers, PLLC (57) ABSTRACT

A control unit 18 transmits via a processing unit 16 through a wireless unit 12 a participation request to a registrar among multiple other terminal apparatuses forming an ad hoc network. The control unit 18 receives participation approval via the wireless unit 12 through the processing unit 16. The wireless unit 12 through the processing unit 16 all communicate by participating in the ad hoc network when the participation approval is received. The control unit 18 broadcasts a search signal for searching another terminal apparatus to which a role of approving participation of a new terminal apparatus in the ad hoc network is assigned, prior to the transmission of a participation request.

3 Claims, 7 Drawing Sheets

OTHER PUBLICATIONS

International Preliminary Examination Report on Patentability (I) w/ an English Translation thereof issued in International Application No. PCT/JP2008/000929 dated Nov. 19, 2009.

Japanese Notification of Reason(s) for Refusal, w/ English translation thereof, issued in Japanese Patent Application No. JP 2007-107230 dated Apr. 5, 2011.

Japanese Notification of Reasons for Refusal, w/ English translation thereof, issued in Japanese Patent Application No. JP 2007-107230 dated Jul. 5, 2011.

Japanese Office Action, with English translation, issued in Japanese Patent Application No. 2007-107230, dated Oct. 25, 2011.

* cited by examiner

| DESTINATION ADDRESS (30) | HOP-DESTINATION ADDRESS (32) | HOP NUMBER (34) | ... |
|---|---|---|---|
| A1 | B1 | C1 | ... |
| A2 | B1 | C1 | ... |
| AM | BL | CK | ... |

COMMUNICATION METHOD AND, TERMINAL APPARATUS AND COMMUNICATION SYSTEM USING THE METHOD

RELATED APPLICATIONS

This application is the U.S. National Phase under 35 U.S.C. §371 of International Application No. PCT/JP2008/000929, filed on Apr. 9, 2008, which in turn claims the benefit of Japanese Application No. 2007-107230, filed on Apr. 16, 2007, the disclosures of which Applications are incorporated by reference herein.

TECHNICAL FIELD

The present invention relates to communication technology and particularly to a communication method in an ad hoc network and to a terminal apparatus and a communication system using the communication method.

BACKGROUND ART

An ad hoc network does not depend on any base station apparatus or wired network and is an autonomous distributed network including a terminal apparatus as a constituent element. In an ad hoc network, terminal apparatuses are equal to one another, and information exchange is carried out by implementing multi-hop networking. Routing methods for such ad hoc networks include a table driving method, an on-demand method, and a hybrid method. In a table driving method, each terminal apparatus holds a routing table storing the destination of a packet signal in relation with a next-hop destination. The terminal apparatus also determines the next-hop destination from the destination of a packet signal by referring to the routing table. The routing table is periodically updated by a control packet signal. Examples of a table driving method include DSDV (Destination Sequence Distance Vector), WRP (Wireless Routing Protocol), CGSR (Clusterhead Gateway Switch Routing), and OLSR (Optimized Link State Routing).

In an on-demand method, a terminal apparatus of information generation source finds a route to a destination when requesting the transfer of a packet signal. The terminal apparatus of information generation source learns a reverse route to the terminal apparatus of information generation source by transferring a packet signal for inquiry by using a flooding method, and a destination terminal apparatus that has received the packet signal for inquiry responds. Based on a route found in such a manner, a packet signal is transferred from a terminal apparatus of a generation source to a destination terminal apparatus. Examples of an on-demand method include AODV (Ad hoc On demand Distance Vector), DSR (Dynamic Source Routing), TORA (Temporally Ordered Routing Algorithm), RDMAR (Relative Distance Micro-discovery Ad hoc Routing Protocol), and ABR (Associativity-Based Routing). A hybrid method is a combination method of the table driving method and the on-demand method.

In an ad hoc network, a technique has been suggested for simplifying the settings of terminal apparatuses. A predetermined terminal apparatus retains communication setting information, and a tag is held over near an IC card reader/writer mounted on the terminal apparatus. As a result, by having noncontact communication with a tag, the IC card reader/writer transmits the communication setting information. By performing in reverse the above-stated procedure between the tag and an IC card reader/writer mounted on another terminal apparatus, the communication setting information is transmitted to the terminal apparatus.

DISCLOSURE OF INVENTION

Technical Problem

In consideration of being user friendly, the procedure of a terminal apparatus for connecting to an ad hoc network is desirably simple. On the other hand, since an ad hoc network is formed by a plurality of terminal apparatuses, security measures are necessary in consideration of the influence on other terminal apparatuses. In order to improve the security, a role of approving the participation of a new terminal apparatus in the ad hoc network is assigned to any one of the plurality of terminal apparatuses forming the ad hoc network (hereinafter, the terminal apparatus to which the role is assigned is referred to as a "registrar"). In order to improve the simplicity of the connecting procedure, the connecting procedure is performed when a button provided to a new terminal apparatus is pushed down within a predetermined period after a button provided to the registrar is pushed down.

In this background, the inventor has come to realize the following problem. The above-stated connecting procedure is started by pushing down the button provided to the registrar. However, since an ad hoc network is formed by a plurality of terminal apparatuses, there can be a situation where the user of a new terminal apparatus that is about to join in the ad hoc network cannot easily recognize the terminal apparatus that serves as the registrar. Even in this kind of situation, the user operating the new terminal apparatus is preferably notified of the terminal apparatus that serves as the registrar in order to improve the simplicity of the connecting procedure.

In this background, a general purpose of the present invention is to provide a communication technique for improving the simplicity of the connecting procedure while maintaining ad hoc network security.

Means for Solving the Problem

In order to solve the problem, a terminal apparatus according to one embodiment of the present invention comprises: a request unit operative to transmit a participation request to another terminal apparatus, to which the role of approving the participation of a new terminal apparatus in an ad hoc network, among a plurality of other terminal apparatuses forming the ad hoc network; a reception unit operative to receive participation approval from said another terminal apparatus to which the participation request has been transmitted by the request unit; and a communication unit operative to communicate by participating in the ad hoc network when the participation approval is received by the reception unit. The request unit broadcasts a search signal for searching another terminal apparatus to which a role of approving participation of a new terminal apparatus in the ad hoc network is assigned, prior to the transmission of the participation request.

Another embodiment of the present invention also relates to a terminal apparatus. The terminal apparatus comprises: a communication unit operative to communicate while forming an ad hoc network with other terminal apparatuses; a reception unit operative, when being assigned a role of approving participation of a new terminal apparatus in an ad hoc network formed by the communication unit, to receive a participation request from a new terminal apparatus via the communication unit; a processing unit operative to perform an approval process on the participation request received by the reception unit; and a notification unit operative to give notification of the result of the approval process performed by the processing unit. Upon the receipt of a search signal for searching a terminal apparatus to which a role of approving participation of a new terminal apparatus in the ad hoc network is assigned prior to the participation request, the notification unit gives notification indicating the terminal apparatus responsible for approval.

Still another embodiment of the present invention relates to a communication system. The communication system comprises: a plurality of terminal apparatuses operative to communicate by forming an ad hoc network; and a new terminal apparatus operative to request participating in the ad hoc network formed by the plurality of terminal apparatuses. A role of approving participation of the new terminal apparatus in the ad hoc network is assigned to any one of the plurality of terminal apparatuses, and the new terminal apparatus broadcasts a search signal for searching another terminal apparatus to which the role of approving participation of a new terminal apparatus in the ad hoc network is assigned.

Still another embodiment of the present invention relates to a communication method. The method comprises: transmitting a participation request to another terminal apparatus, to which the role of approving the participation of a new terminal apparatus in an ad hoc network, among a plurality of other terminal apparatuses forming the ad hoc network; receiving participation approval from said another terminal apparatus to which the participation request has been transmitted; and communicating by participating in the ad hoc network when the participation approval is received. In transmitting the participation request, a search signal for searching another terminal apparatus to which a role of approving participation of a new terminal apparatus in the ad hoc network is assigned is broadcasted, prior to the transmission of the participation request.

Optional combinations of the aforementioned constituting elements, and implementations of the invention in the form of methods, apparatuses, systems, recording mediums, and computer programs may also be practiced as additional modes of the present invention.

Effect of the Invention

According to the present invention, the simplicity of the connecting procedure can be improved while maintaining ad hoc network security.

EXPLANATION OF REFERENCE 10 terminal apparatus
12 wireless unit
14 modem unit
16 processing unit
18 control unit
20 memory unit
22 operation unit
24 monitor
26 speaker
100 communication system

BEST MODE FOR CARRYING OUT THE INVENTION

An outline of the present invention will be given before a specific description thereof. Exemplary embodiments of the present invention relate to a communication system that executes an ad hoc network formed by multiple terminal apparatuses. In an ad hoc network, any one of the multiple terminal apparatuses is determined to be the above-stated registrar. As described previously, a connecting procedure is started by pushing down the button provided with the registrar (hereinafter, referred to as "approval mode"); however, since an ad hoc network is formed by a plurality of terminal apparatuses, there can be a situation where the user of a new terminal apparatus that is about to join in the ad hoc network cannot easily recognize the terminal apparatus that serves as the registrar. In such a situation, the communication system according to the present exemplary embodiment of the present invention performs the following process in order to improve user-friendliness, that is, the simplicity of the connecting procedure.

The new terminal apparatus gives notification of a signal for searching for a registrar (hereinafter, referred to as a "search signal"). The terminal apparatuses forming the ad hoc network receive the search signal. The registrar among the terminal apparatuses that have received the signal gives notification indicating the representation of it being the registrar. As a result, the user of the new terminal apparatus that is about to join in the ad hoc network can recognize the registrar.

A communication system mainly performs: (1) a process of connecting a new terminal apparatus to an ad hoc network (hereinafter, referred to as "connection process"); (2) a process of generating a routing table for the ad hoc network (hereinafter, referred to as "generation process"); and (3) a process of transferring a data signal in the ad hoc network based on the routing table (hereinafter, referred to as "transfer process"). The previously-stated approval process is included in the connection process of the item (1).

Figure 1:
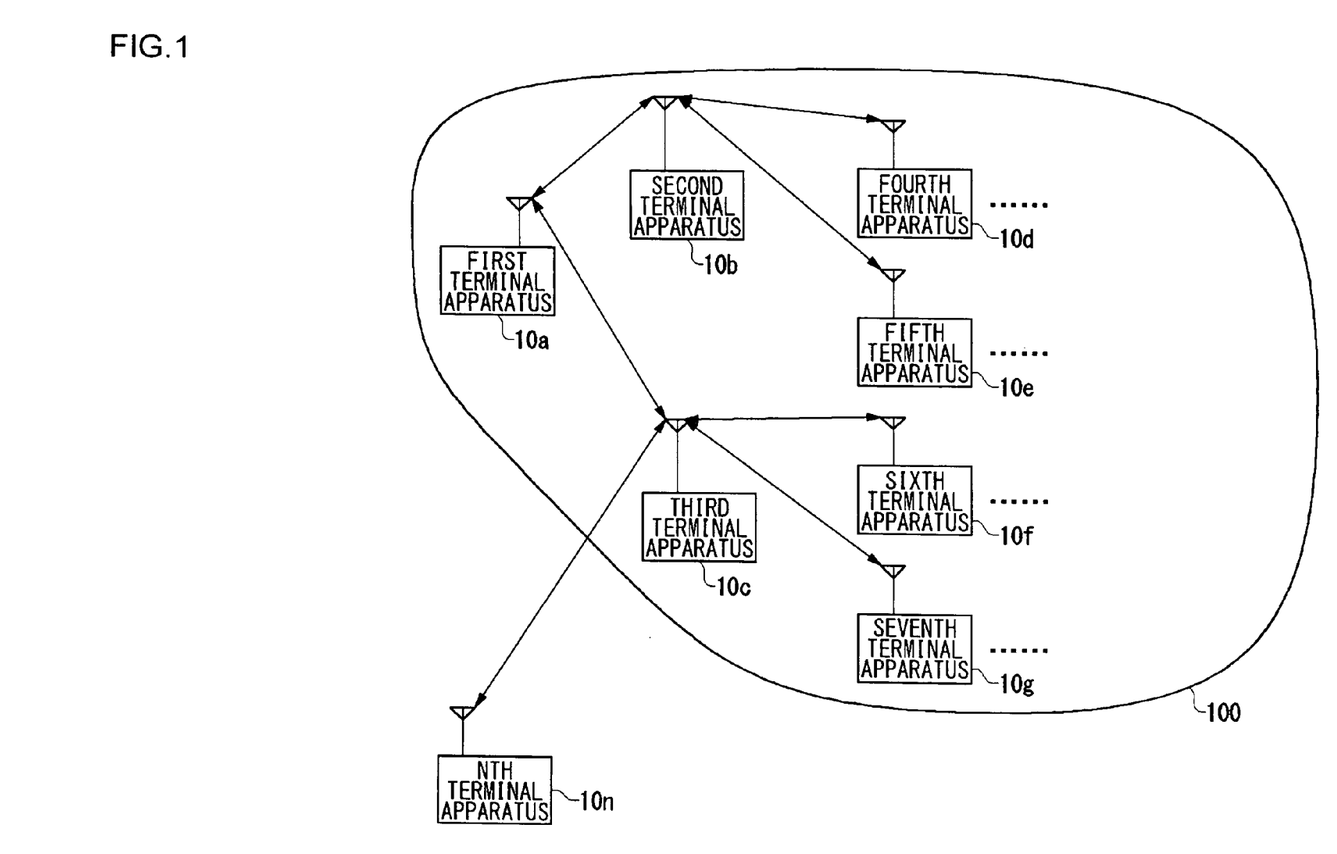
FIG. 1 is a diagram illustrating the configuration of a communication system according to an embodiment of the present invention.

FIG. 1 shows the configuration of a communication system 100 according to the embodiment of the present invention. The communication system 100 includes a first terminal apparatus 10a, a second terminal apparatus 10b, a third terminal apparatus 10c, a fourth terminal apparatus 10d, a fifth terminal apparatus 10e, a sixth terminal apparatus 10f, and a seventh terminal apparatus 10g, which are all generically called a terminal apparatus 10. An Nth terminal apparatus 10n is about to be included in the communication system 100.

Multiple terminal apparatuses 10, for example, the first terminal apparatus 10a through the seventh terminal apparatus 10g, communicate by forming an ad hoc network. The terminal apparatus 10 constituting the ad hoc network is not limited to the first terminal apparatus 10a through the seventh terminal apparatus 10g. The multiple terminal apparatuses 10, for example, correspond to a wireless LAN system that complies with standards such as IEEE 802.11. As previously described, routing methods for ad hoc networks needs to correspond to publicly-known techniques such as a table driving method, an on-demand method, and a hybrid method.

For example, in the case of corresponding to a table driving method, a routing table is updated by a publicly-known technique.

In addition to a communication function in a normal ad hoc network, a role of approving the participation of a new terminal apparatus 10 in the ad hoc network is assigned to any one of multiple terminal apparatuses 10, for example, the third terminal apparatus 10c. In other words, the third terminal apparatus 10c corresponds to the previously-stated registrar. A registrar can be described as a component having an authorization to issue or cancel a qualification to participate in an ad hoc network. The processes performed in the registrar will hereinafter be described in detail. The function of the registrar is provided to the terminal apparatuses 10 other than the third terminal apparatus 10c; however, the function is assumed to be inactive under the present circumstances. In order to clarify the explanation, it is assumed that one registrar is included in the communication system 100.

The new terminal apparatus 10, in other words, the Nth terminal apparatus 10n requests participation in the ad hoc network formed by the multiple terminal apparatuses 10. The Nth terminal apparatus 10n makes a request to the registrar for participation. When participation is allowed by the registrar, the Nth terminal apparatus 10n becomes a component of the communication system 100. In the following explanation, the Nth terminal apparatus 10n and the registrar may be referred to as a "requestor" and a "responder," respectively, for convenience sake.

Figure 2:
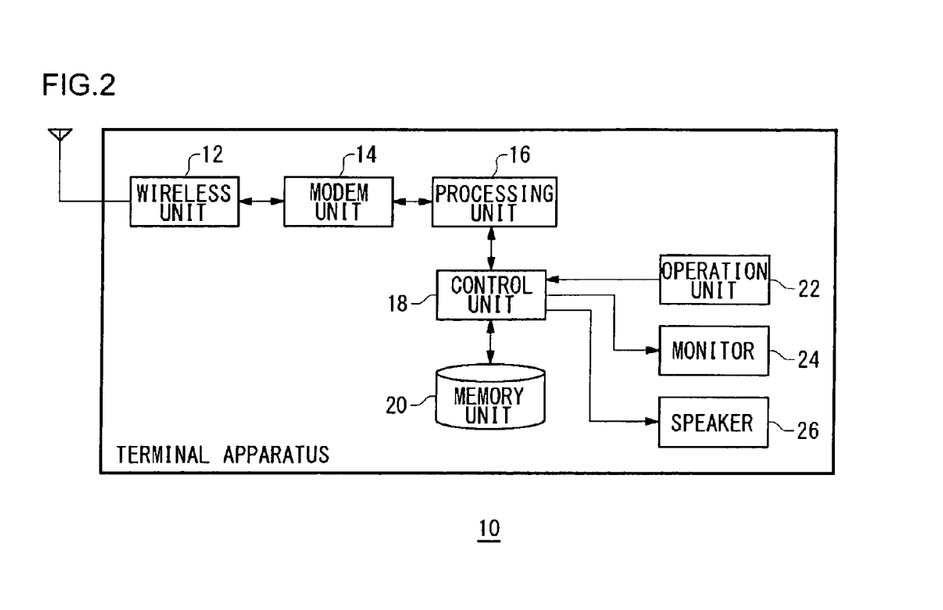
FIG. 2 is a diagram illustrating the configuration of a terminal apparatus shown in FIG. 1.

FIG. 2 shows the configuration of the terminal apparatus 10. The terminal apparatus 10 includes a wireless unit 12, a modem unit 14, a processing unit 16, a memory unit 20, an operation unit 22, a monitor 24, and a speaker 26. FIG. 1 shows the multiple terminal apparatuses 10 and further shows terminal apparatuses 10 that correspond to a requestor and to a responder. All the terminal apparatuses 10 have configurations as shown in FIG. 2.

The wireless unit 12 performs communication while forming an ad hoc network with other terminal apparatuses 10. The wireless unit 12 performs frequency conversion on a wireless frequency signal received via an antenna and generates a baseband signal, acting as a reception process. Furthermore, the wireless unit 12 outputs the baseband signal to the modem unit 14. In general, a baseband signal is formed by both an in-phase component and a quadrature component, and two signal lines should thus be shown. However, for the purpose of clarifying the figure, only one signal line is shown. The wireless unit 12 also includes an LNA (Low Noise Amplifier), a mixer, an AGC, and an A/D converter.

The wireless unit 12 performs frequency conversion on a baseband signal input from the modem unit 14 and generates a wireless frequency signal, acting as a transmission process. Furthermore, the wireless unit 12 transmits the wireless frequency signal from an antenna. The wireless unit 12 also includes a PA (Power Amplifier), a mixer, and a D/A converter.

The modem unit 14 performs demodulation on the baseband signal from the wireless unit 12, acting as a reception process. Furthermore, the modem unit 14 outputs a result of demodulation to the processing unit 16. The modem unit 14 performs modulation on a signal from the processing unit 16, acting as a transmission process. Furthermore, the modem unit 14 outputs the result of modulation to the wireless unit 12 as a baseband signal. When the terminal apparatus 10 corresponds to an OFDM modulation scheme such as an IEEE802.11a standard, the modem unit 14 performs FFT as a reception process and performs IFFT as a transmission process. When the terminal apparatus 10 corresponds to a spread spectrum scheme such as the IEEE802.11b standard, the modem unit 14 performs despreading, which acts as a reception process, and performs spreading, which acts as a transmission process. Moreover, when the terminal apparatus 10 corresponds to an MIMO scheme such as an IEEE802.11n, the modem unit 14 performs adaptive array signal processing, which acts as a reception process and performs distributed processing on multiple streams, which acts as a transmission process.

The processing unit 16 performs digital signal processing on the signal from the modem unit 14 and on the signal to the modem unit 14. An example of the digital signal processing is error correction coding, acting as a transmission process or error correction decoding, acting as a reception process. The digital signal processing is not limited to these processes. The processing unit 16 outputs to the control unit 18 the result of performing digital signal processing on the signal from the modem unit 14 and inputs from the control unit 18 a signal used as a basis for the signal to the modem unit 14.

The control unit 18 controls the overall movement of the terminal apparatus 10. The processes performed by the control unit 18 are mainly classified into: (1) a connection process; (2) a generation process; (3) a transfer process, which are all previously stated, and (4) an input and output data process. For the sake of ease of explanation, the explanation is given in the order of items (4), (2), and (3) and then the item (1) at the end. First, the explanation is given of the item (4), the input and output data process. The control unit 18 receives the result of digital signal processing from the processing unit 16, acting as an output process, and outputs the result to a monitor 24 and a speaker 26. The control unit 18 receives an instruction signal from the operation unit 22, acting as an input process and outputs corresponding data to the processing unit 16. The operation unit 22 is constituted with a button and the like. When the terminal apparatus 10 is formed so as to be connected with a personal computer, the operation unit 22 may be a keyboard or a mouse, which is provided with the personal computer.

Figure 3:
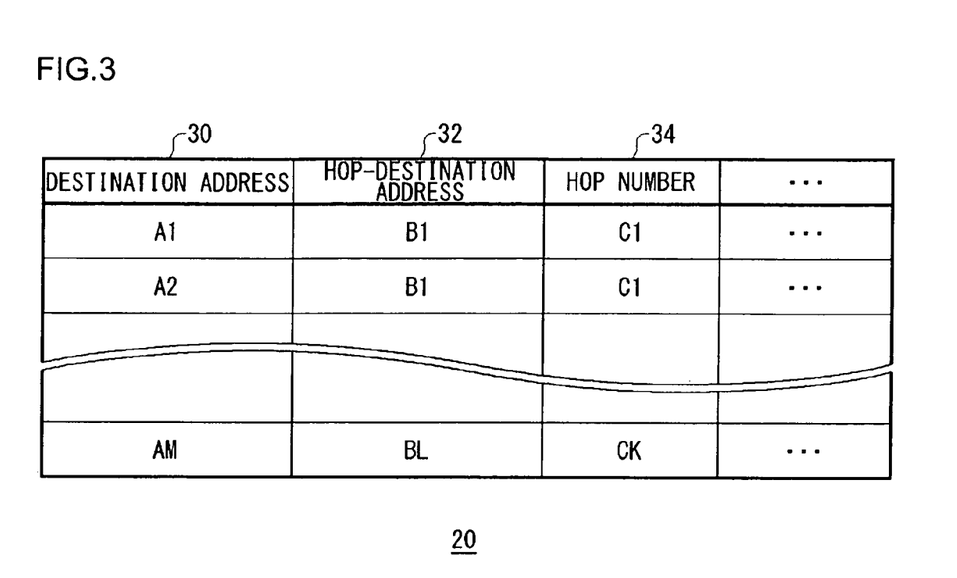
FIG. 3 is a diagram illustrating the data structure of a routing table stored in a memory unit shown in FIG. 2.

The explanation is now given of the item (2), the generation process. As previously described, publicly-known techniques need to be used for the generation of a routing table. The control unit 18 stores a generated routing table in the memory unit 20. FIG. 3 shows the data structure of a routing table stored in the memory unit 20. As shown in the figure, the routing table includes a destination address column 30, a hop-destination address column 32, and a hop number column 34. The routing table may include other information. In the figure, the addresses are shown as "A1," "B1," etc., in the destination address column 30 and in the hop-destination address column 32. In reality, the addresses are shown by, for example, IP addresses. The same applies to the hop number in the hop number column 34. FIG. 2 is referred back again.

The explanation is now given of the item (3), the transfer process. As previously described, publicly-known techniques need to be used for the transfer process. The control unit 18 acquires the destination address of a packet signal received via the wireless unit 12 through the processing unit 16. The control unit 18 identifies the hop-destination address that corresponds to an acquired destination address by referring to the routing table stored in the memory unit 20. Moreover, the control unit 18 transmits a packet signal to the identified hop-destination address via the processing unit 16 through the wireless unit 12.

The explanation is now given of the item (1), the connection process. The connection process is performed by the terminal apparatus 10 of the requestor and the terminal apparatus 10 of the responder. The explanation is given of the process of the control unit 18 in the terminal apparatus 10 of the requestor, followed by the explanation of the process of the control unit 18 in the terminal apparatus 10 of the responder. The terminal apparatus 10 of the requestor corresponds to the Nth terminal apparatus 10*n* of FIG. 1, and the terminal apparatus 10 of the responder corresponds to the third terminal apparatus 10*c* of FIG. 1.

The control unit 18 in the terminal apparatus 10 of the requestor enters into a request mode upon detection of the button of the operation unit 22 being pushed down by a user. Once entering the request mode, the control unit 18 controls the processing unit 16 through the wireless unit 12 so as to transmit to a registrar a packet signal indicating a request for participating in an ad hoc network (hereinafter, referred to as "request signal"). The wireless unit 12 through the processing unit 16 receive from the registrar to which the request signal has been transmitted a packet signal indicating the approval for the participation (hereinafter, referred to as "enabling signal"). An enabling signal is input to the control unit 18. As a result, the control unit 18 enters into a communication mode. Once entering into the communication mode, the control unit 18 controls the wireless unit 12 through the processing unit 16 so that a communication is performed by participating in an ad hoc network.

The control unit 18 in the terminal apparatus 10 of the responder enters an approval mode upon detecting that the predetermined button of the operation unit 22 is pushed down by a user. The approval mode is a state where an approval process can be performed. Once entering into the approval mode, the control unit 18 receives a request signal from the terminal apparatus 10 of the requestor over a predetermined period via the wireless unit 12 through the processing unit 16. The control unit 18 performs the approval process on the received request signal. Publicly-known techniques need to be used for the approval process. For example, the control unit 18 performs a recognition process and an identification process on the terminal apparatus of the requestor after exchanging a public key with the terminal apparatus 10 of the requestor via the wireless unit 12 through the processing unit 16. A "device password" needs to be used for the recognition process.

When the participation is approved, the control unit 18 transmits an enabling signal to the terminal apparatus 10 of the requestor via the processing unit 16 through the wireless unit 12. On the other hand, when the participation is rejected, the control unit 18 transmits a rejection signal to the terminal apparatus 10 of the requestor via the processing unit 16 through the wireless unit 12. After a certain period, the control unit 18 enters a communication mode. Once entering into the communication mode, the control unit 18 controls the wireless unit 12 through the processing unit 16 so that a communication is performed by participating in an ad hoc network.

The configuration is implemented in hardware by any CPU of a computer, memory, or other LSI's and in software by a program having a communication function or the like loaded into the memory. Functional blocks are implemented by the cooperation of hardware and software. Thus, a person skilled in the art should appreciate that there are many ways of accomplishing these functional blocks in various forms in accordance with the components of hardware only, software only, or the combination of both.

Figure 4:
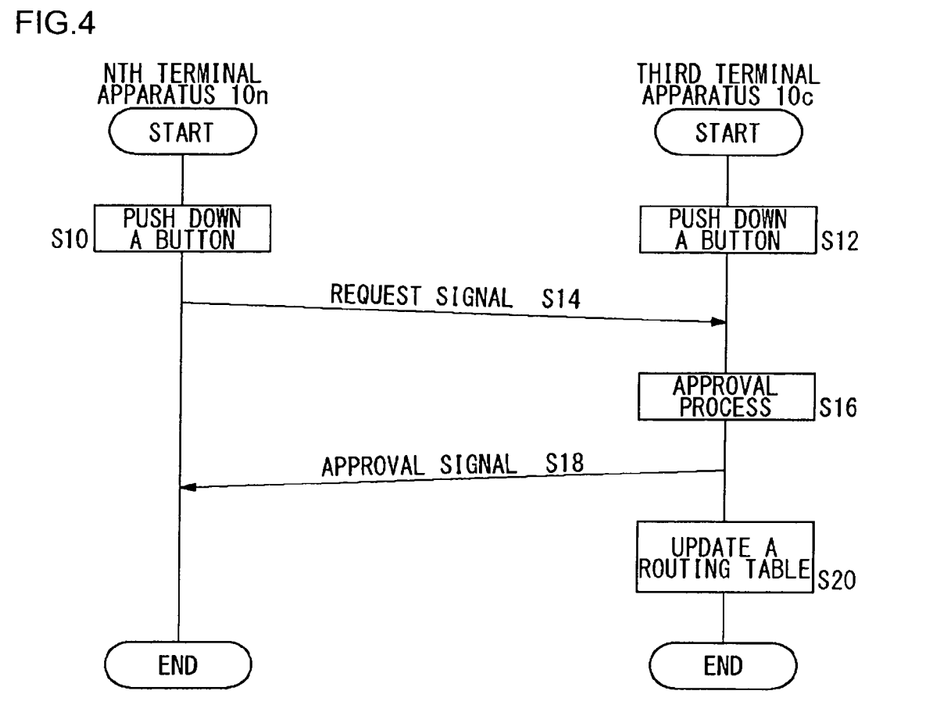
FIG. 4 is a sequence diagram illustrating a connecting procedure in a communication system shown in FIG. 1.

The explanation is given of the movement of the communication system 100 having the above-stated configuration. FIG. 4 is a sequence diagram showing a connecting procedure in the communication system 100. The button of the Nth terminal apparatus 10*n* is pushed down (S10), and the button of the third terminal apparatus 10*c* is pushed down (S12). The Nth terminal apparatus 10*n* transmits a request signal to the third terminal apparatus 10*c* (S14). The third terminal apparatus 10*c* performs the approval process on the Nth terminal apparatus 10*n* (S16). The third terminal apparatus 10*c* transmits an enabling signal to the Nth terminal apparatus 10*n* (S18). The third terminal apparatus 10*c* updates a routing table (S20).

The detailed explanation is given in the following of the item (1), the connection process, and particularly of the process performed in the previous step of the previously-stated connection process. As previously stated, the connection process is started by pushing down the button of the terminal apparatus 10 of the responder and by pushing down the button of the terminal apparatus 10 of the requestor. When the communication system 100 is configured with multiple terminal apparatuses 10, there can be a situation where the user of the terminal apparatus 10 of the requestor cannot recognize the terminal apparatus that serves as the registrar. Under such a circumstance, the terminal apparatus 10 of the requestor and the terminal apparatus 10 to of the responder are configured as shown in the following so that the terminal apparatus 10 serving as the registrar is easily recognized.

The control unit 18 in the terminal apparatus 10 of the requestor broadcasts a search signal for searching for the registrar via the processing unit 16 through the wireless unit 12 upon detection of the button of the operation unit 22 being pushed down by a user. The button of the operation unit 22 may be a button that is pushed down when starting the request mode or may be another button. In the former case, the control unit 18 automatically enters into the request mode after a predetermined period of time after notification is given of the search signal by a push of the button. A probe request packet signal may be used for the search signal or may be a packet signal defined by a layer higher than or equal to the IP layer. In other words, the format for the search signal needs to be determined in the terminal apparatuses 10 included in the communication system 100.

The control unit 18 in the terminal apparatus 10 of the responder receives the search signal via the wireless unit 12 through the processing unit 16 during the communication mode. Upon the receipt of the search signal, by outputting a predetermined sound from the speaker 26 provided to the terminal apparatus 10 of the responder, the control unit 18 gives notification indicating that the terminal apparatus 10 represents the registrar. Upon the receipt of the search signal, the control unit 18 may light an LED (not shown) provided to the terminal apparatus 10 of the responder. When the terminal apparatus 10 is configured in combination with a personal computer, an LED provided to the personal computer may be lit.

A user of the terminal apparatus 10 of the requestor can recognize the existence of the terminal apparatus 10 of the responder by identifying the terminal apparatus 10 from which the sound is being output or by identifying the terminal apparatus 10 in which the LED is being lit. The connection process is then started by pushing down the button of the terminal apparatus 10 of the responder and by pushing down the button of the terminal apparatus 10 of the requestor.

Figure 5:
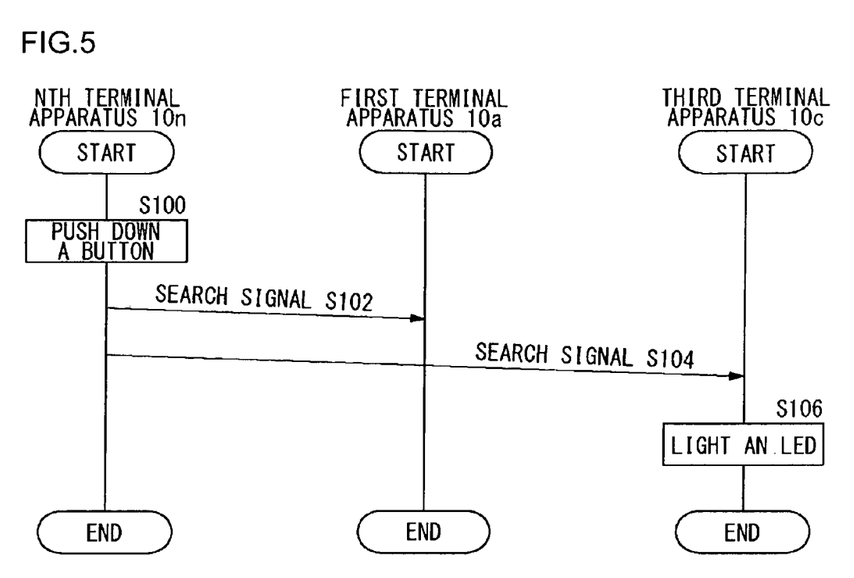
FIG. 5 is a sequence diagram illustrating a notification procedure in a communication system shown in FIG. 1.

FIG. 5 is a sequence diagram showing a notification procedure in the communication system 100. A button is pushed down by a user for the Nth terminal apparatus 10*n* (S100). The Nth terminal apparatus 10*n* gives notification of the search signal (S102 and S104). In FIG. 5, the notification of the search signal is shown in another step for convenience sake. Although the first terminal apparatus 10*a* receives the search signal, the first terminal apparatus 10*a*, not being the registrar, ignores the search signal. On the other hand, the third terminal apparatus 10*c*, being the registrar, lights the LED upon the receipt of the search signal (S106).

Figure 6:
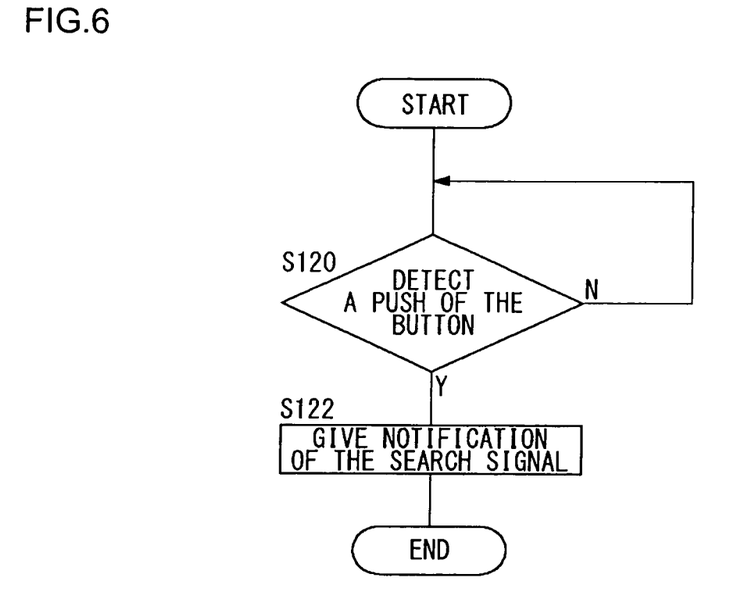
FIG. 6 is a flowchart illustrating a notification procedure in a terminal apparatus shown in FIG. 2.

FIG. 6 is a flowchart illustrating a notification procedure in the terminal apparatus 10. The control unit 18 stands by if no push of the button of the operation unit 22 is detected (N in S120). On the other hand, when the button of the operation unit 22 is detected as begin pushed down (Y in S120), the control unit 18 gives notification of the search signal via the processing unit 16 through wireless unit 12 (S122).

The explanation is given in the following of the item (1), the connection process, and particularly of another embodiment of the process performed in the previous step of the previously-stated connection process. It is assumed that there exist multiple communication systems 100 and where there is a registrar for each communication system 100. Therefore, it is assumed that there exist multiple registrars and that the multiple registrars are located in such a manner that the registrars can receive a search signal from the terminal apparatus 10 of the requestor. In this case, when the terminal apparatus 10 of the requestor transmits a search signal, the LEDs of the multiple registrars are lit. As a result, it is possible that the user of the terminal apparatus 10 of the requestor cannot identify one registrar. Even in this kind of situation, the terminal apparatus 10 is configured as shown in the following so that one registrar can be identified.

As previously described, upon the receipt of the search signal via the wireless unit 12 through the processing unit 16, the control unit 18 in the terminal apparatus 10 of the responder transmits, in addition to lighting the LED, a response signal for the search signal via the processing unit 16 through the wireless unit 12. The response signal represents a signal indicating being transmitted by the registrar. The destination of the response signal is the terminal apparatus 10 of the requestor that has transmitted the search signal.

As previously described, the control unit 18 in the terminal apparatus 10 of the requestor gives notification of the search signal via the processing unit 16 through the wireless unit 12. The control unit 18 receives from the registrar the response signal for the search signal via the wireless unit 12 through the processing unit 16. There may be a case where multiple response signals are received, in other words, where there exist multiple registrars. The control unit 18 requests the wireless unit 12 lower the signal intensity and gives notification of the search signal again. In other words, notification is given again of the search signal with lowered transmission power. The same applies to the subsequent processes. Thus, the explanation thereof is omitted.

Figure 7:
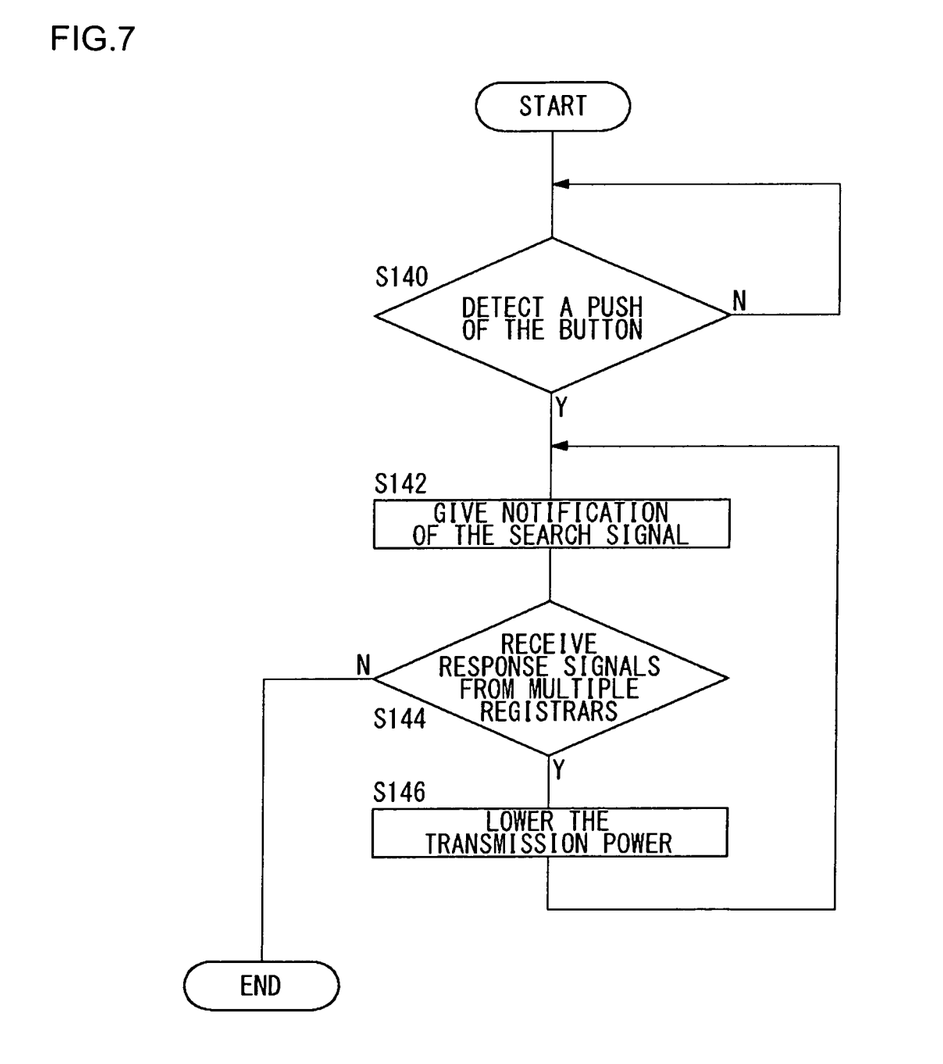
FIG. 7 is a flowchart illustrating another notification procedure in a terminal apparatus shown in FIG. 2.

FIG. 7 is a flowchart illustrating another notification procedure in the terminal apparatus 10. The control unit 18 stands by if no push of the button of the operation unit 22 is detected (N in S140). On the other hand, when the button of the operation unit 22 is detected as begin pushed down (Y in S140), the control unit 18 gives notification of the search signal via the processing unit 16 through wireless unit 12 (S142). Upon the receipt of the response signal from the multiple registrars via the wireless unit 12 through the processing unit 16 (Y in S144), the control unit 18 requests the wireless unit 12 to lower the transmission power (S146). Step 142 is referred back. In other words, as a result of the search signal transmission, if the state where the response signals are received from the multiple registrars is repeated for multiple times, the transmission power of the search signal is lowered in stages. On the other hand, when the control unit 18 receives no response signal from the multiple registrars via the wireless unit 12 through the processing unit 16 (N in S144), the process is terminated.

According to the exemplary embodiment of the present invention, notification is given of a search signal for searching a registrar, and the registrar responds, prior to the transmission of a request signal. Thus, the registrar can be easily identified. The easy identification of the registrar allows for the improvement of the simplicity of the connecting procedure. The approval process is performed by the registrar after the request signal is transmitted to the identified registrar. Thus, the security of an ad hoc network can be maintained. Giving notification indicating being the registrar prior to a participation request upon the receipt of the search signal allows for the improvement of the simplicity of the connecting procedure. Even when multiple registrars exist close to one another, transmitting the search signal while lowering the transmission power in stages allows for the identification of one registrar.

Described above is an explanation based on the exemplary embodiments of the present invention. These exemplary embodiments are intended to be illustrative only, and it will be obvious to those skilled in the art that various modifications to constituting elements and processes could be developed and that such modifications are also within the scope of the present invention.

In the exemplary embodiment of the present invention, the terminal apparatus 10 performs both the connection process and the transfer process while using the same wireless unit 12 and the modem unit 14. In other words, the both processes are performed while using a wireless LAN. However, the embodiment is not limited to this example. For example, another wireless unit 12 and modem unit 14 may be used for the connection process and the transfer process. In other words, while a wireless LAN is used for the transfer process, another communication system may be used for the connection process, or vice versa. The exemplary embodiments allow the degree of freedom of the configuration of a communication system to be improved.

INDUSTRIAL APPLICABILITY

According to the present invention, the simplicity of the connecting procedure can be improved while maintaining ad hoc network security.

The invention claimed is:
1. A terminal apparatus comprising:
a request unit operative to transmit a participation request to a registrar apparatus, to which the role of approving the participation of a new terminal apparatus in network is assigned and which is enabled to approve a new terminal apparatus when entering an approval mode;
a reception unit operative to receive participation approval from said registrar apparatus to which the participation request has been transmitted by the request unit; and
a communication unit operative to communicate by participating in the network when the participation approval is received by the reception unit, wherein
the request unit searches for a registrar apparatus enabled to approve a new terminal apparatus, prior to the transmission of the participation request in a request mode;
the terminal apparatus is drivable between a first condition in which said request unit is in the request mode, and a second condition in which the terminal apparatus is in the approval mode; and
the request unit broadcasts a search signal to perform a search and broadcasts the search signal again while lowering the signal intensity in stages in accordance with the number of times that the search signal is broadcast when a plurality of registrars other terminal apparatuses is found to exist as a result of broadcasting the search signal.

2. A communication system comprising:

a plurality of terminal apparatuses operative to communicate by forming network;

a new terminal apparatus operative to request participating in the network formed by the plurality of terminal apparatuses; and a registrar apparatus, to which the role of approving the participation of a new terminal apparatus in the network is assigned and which is enabled to approve a new terminal apparatus when entering an approval mode, wherein the new terminal apparatus searches for a registrar apparatus enabled to approve a new terminal apparatus prior to the transmission of the participation request in a request mode and wherein each of the plurality of terminal apparatuses comprises:

a request unit operative to transmit a participation request to a registrar apparatus, to which the role of approving the participation of a new terminal apparatus in network is assigned and which is enabled to approve a new terminal apparatus when entering an approval mode;

a reception unit operative to receive participation approval from said registrar apparatus to which the participation request has been transmitted by the request unit; and a communication unit operative to communicate by participating in the network when the participation approval is received by the reception unit, wherein the request unit searches for a registrar apparatus enabled to approve a new terminal apparatus, prior to the transmission of the participation request in a request mode; and wherein the terminal apparatus is drivable between a first condition in which said request unit is in the request mode, and a second condition in which the terminal apparatus is in the approval mode; and the request unit broadcasts a search signal to perform a search and broadcasts the search signal again while lowering the signal intensity in stages in accordance with the number of times that the search signal is broadcast when a plurality of registrars other terminal apparatuses is found to exist as a result of broadcasting the search signal.

3. A communication method for use in the communication system of claim 2, comprising the steps of:

transmitting a participation request from one terminal apparatus to another terminal apparatus, to which the role of approving the participation of a new terminal apparatus in network is assigned and which is enabled to approve a new terminal apparatus when entering an approval mode;

receiving participation approval from said registrar apparatus to which the participation request has been transmitted; and communicating by participating in the ad hoc network when the participation approval is received, wherein in transmitting the participation request, a registrar apparatus enabled to approve a new terminal apparatus is searched for, prior to the transmission of the participation request in a request mode; and wherein the terminal apparatus is drivable between a first condition in which said request unit is in the request mode, and a second condition in which the terminal apparatus is in the approval mode.

* * * * *

UNITED STATES PATENT AND TRADEMARK OFFICE
CERTIFICATE OF CORRECTION

PATENT NO.        : 8,441,994 B2
APPLICATION NO. : 12/596354
DATED             : May 14, 2013
INVENTOR(S)       : Kiyoshige Ito It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this
Eighth Day of September, 2015

Michelle K. Lee
*Director of the United States Patent and Trademark Office*